UNITED STATES PATENT OFFICE.

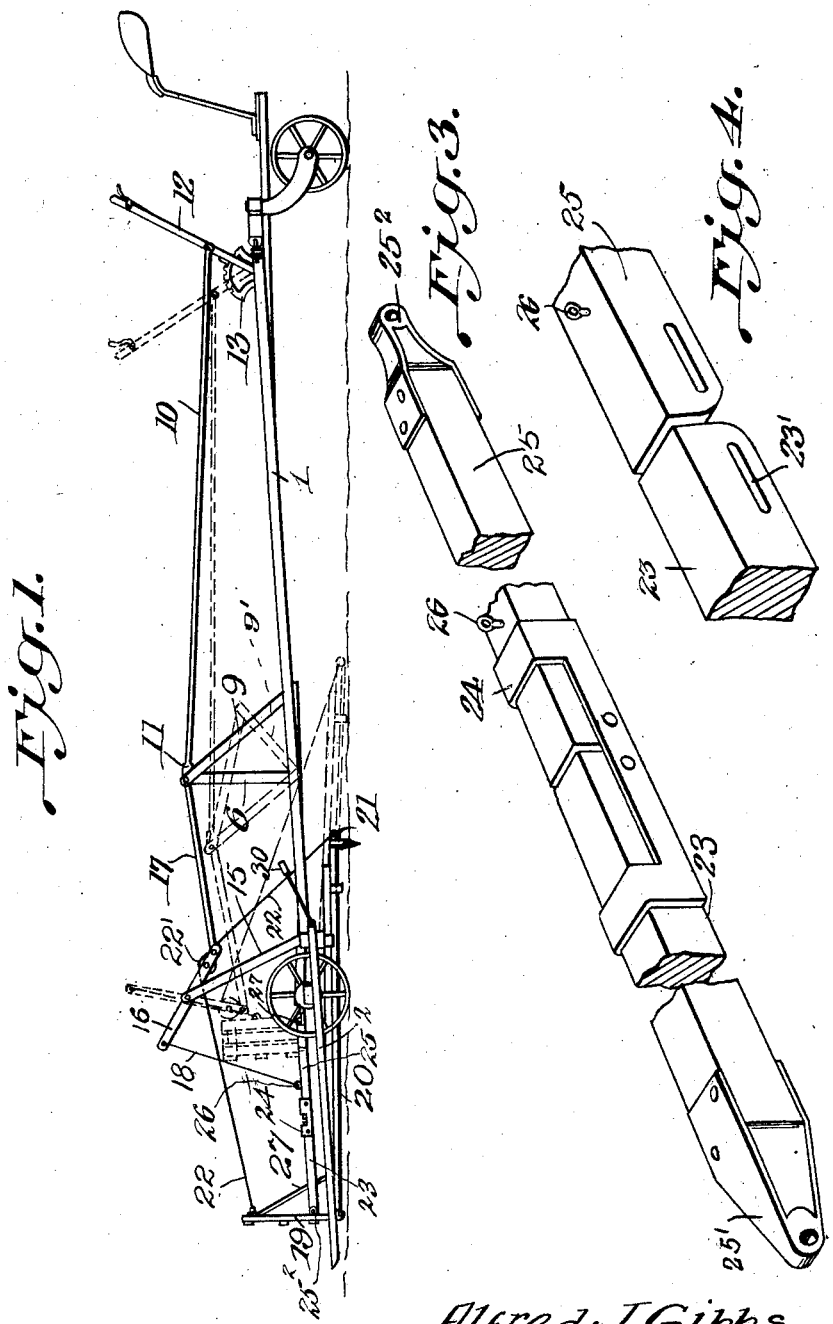

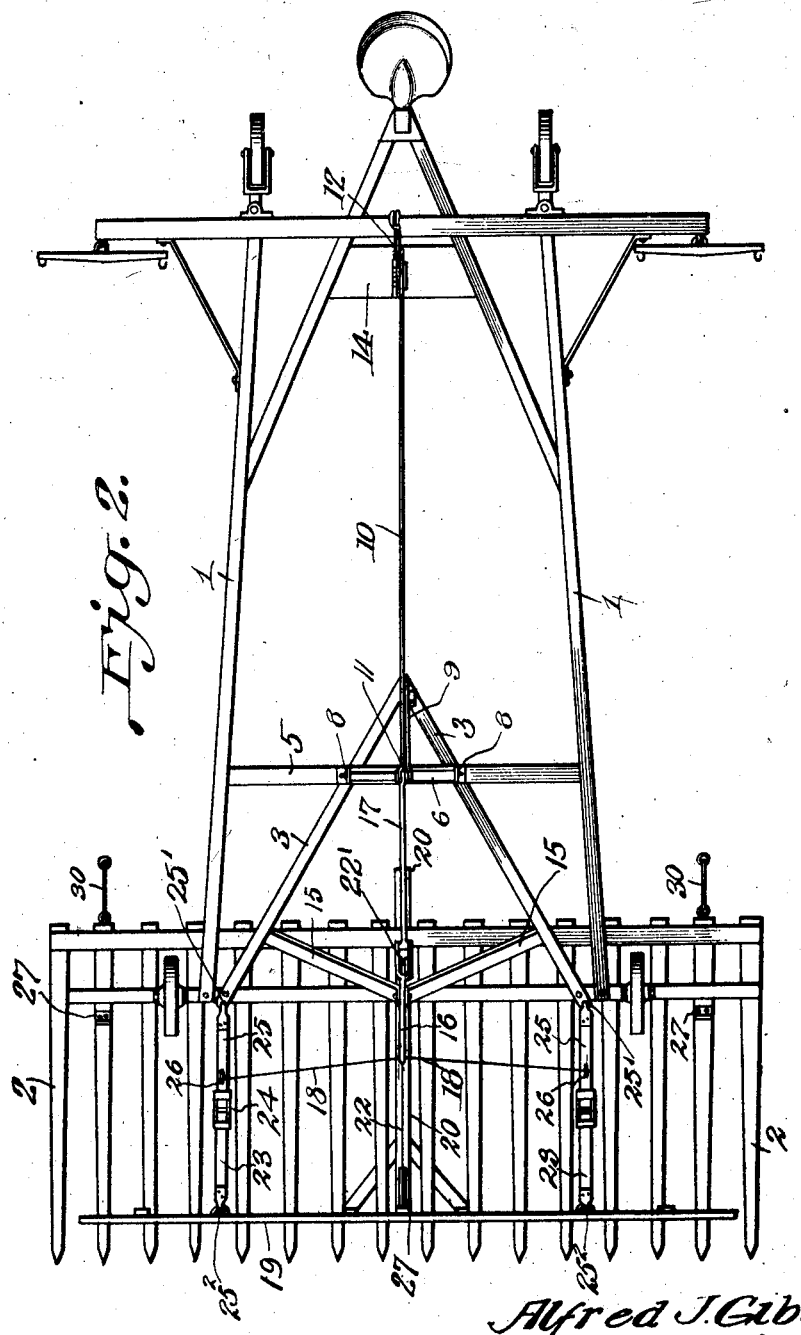

ALFRED JOHN GIBBS, OF HAY SPRINGS, NEBRASKA.

PUSH-RAKE.

1,350,218.  Specification of Letters Patent.  Patented Aug. 17, 1920.

Application filed March 12, 1917. Serial No. 154,329.

*To all whom it may concern:*

Be it known that I, ALFRED JOHN GIBBS, a citizen of the United States, and resident of Hay Springs, in the county of Sheridan and State of Nebraska, have invented certain new and useful Improvements in Push-Rakes, of which the following is a specification.

This invention relates to hay rakes and has more especial reference to improvements in push off attachments to devices of this character.

The dominant object of the invention is to provide a simply constructed push off attachment whereby the gathered load may be removed from the raking mechanism and transferred to a stacking or loading device.

It is also an object of the invention to provide novel bracing means for holding the raking device in position during the pushing off operation.

All of the foregoing together with additional advantageous details and arrangements of parts of the preferred embodiment of my invention will be clear from the specific description hereinafter contained, when read in connection with the accompanying drawings forming a part thereof, wherein said embodiment of the invention is illustrated for the purpose of facilitating a full understanding of the present improvements.

In the drawings:

Figure 1 is a side elevation of my improved attachment as applied to a push rake;

Fig. 2 is a top plan thereof;

Fig. 3 is an enlarged fragmentary detail in perspective showing one of the hinged bracing arms;

Fig. 4 is a similar view showing the manner of forming the adjacent ends of the bracing arms.

Similar characters of reference are employed in all of the above described views to indicate corresponding parts.

Referring now more specifically to the several figures of the said drawings, there is provided the ordinary wheeled frame, designated in its entirety by the numeral 1, commonly used in constructions of this nature. A rake 2 is arranged upon the forward portion of the frame 1 and supported by the forward wheels and obviously serves to gather hay from a field or other surface as the same is pushed forwardly thereover by draft animals.

A substantially V-shaped frame 3 is secured to the forward axle of the wheeled frame 1 and extends rearwardly under a cross bar 5 secured to the side portions of the frame. An upright 6 is pivotally secured as shown at 8 to the cross bar 5 intermediate its ends, and braced by a member 9, the latter in turn connected at its lower end to the member 6 by a tie member 9'. An operating rod 10 is pivotally connected at one end at 11 to the upper ends of the members 6 and 9 and pivoted at the other end to a lever 12 pivotally mounted upon the cross member 14 and operating over a suitable quadrant 13 likewise supported on the cross bar 14. Divergent uprights 15 are arranged upon the V-shaped frame 3 and pivotally support between their upper ends, an arm 16 having its opposite ends apertured whereby a connecting rod 17 may be secured to one end thereof and a plurality of cables or other flexible connections 18 secured to the other end. As will be noted, the rod 17 is secured to the adjacent end of the member 10 as shown at 11, while the free extremities of the cables 18 are secured to bracing arms, which will be presently described.

An abutment 19 comprising a plurality of horizontally disposed slats secured to suitable bracing elements is slidably arranged upon the teeth of the rake 2 and has connected to the same, preferably intermediate its ends, the forward terminal of an operating rod 20. The operating rod 20 has secured to the free rear extremity thereof a depending tooth or spur 21. The member 20 is rigidly connected to the abutment by braces 27 as shown. A cable 22 is engaged with a suitable portion of the abutment 19 and extends rearwardly of the rake and over a pulley 22' mounted in the pivotal arm 16 and thence connected to the free extremity of the operating rod 20.

As means for moving the abutment 19 into its forward position adjacent the forward extremities of the rake teeth, I employ a pair of hingedly connected arms 23 and 25, the adjacent extremities of the said arms being slotted as at 23' and engaged with suitable pivot bolts carried by a combined hinge and guide plate 24. Coupling bands 25' and 25² are secured to the opposite extremities of the hinged arms 23 and 25 and are pivotally connected respectively to the abutment 19 and the forward axle of the wheeled frame 1. An eye 26 is engaged with each of the arms 25 and these eyes receive the free extremities of the cables 18. By this arrangement, it will be evident, that when the lever 12 is moved into its forward position the hinged arms 23 and 25 will be arranged in relatively parallel relation and produce a rigid bracing unit, which will serve to hold the abutment 19 in position near the rear ends of the rake teeth, as shown by dotted lines in Fig. 1.

Obviously, the construction shown is capable of considerable modification and such modification as is within the scope of my claims, I consider within the spirit of my invention.

With an apparatus thus constructed the operation is as follows: The lever 12 is moved to its forward position with the effect of causing the push rod 10 to tilt the frame 6—9 into its forward position and cause the push rod 17 to actuate the lever arm 16 and draw the brace bars 23 and 25 into the position shown by dotted lines in Fig. 1. This action draws the abutment 19 into its rearward or inoperative position, leaving the teeth of the rake free to gather a load of hay when moved over the ground.

When the load has been gathered the rake device is moved to the locality of the stack, or the stacker apparatus. The pawl of the lever 12 is released and the frame with the rake device attached moved rearwardly by attaching the draft animals to the pull devices 30. The first rearward movement causing the spur 21 of the member 20 to engage the ground and thus anchor the abutment 19 in position. As the rearward movement continues the rake teeth are drawn beneath the abutment and the load of hay thereon stripped from the teeth, the bars 23—25 being at the same time disposed automatically into the longitudinally alined position shown in full lines in Figs. 1 and 2.

After the load has been discharged the lever 12 is again actuated to move the abutment 19 into its inoperative position ready for the next load.

I claim:

1. A push rake including a wheeled frame, a rake proper disposed forwardly of the frame, a sliding vertical abutment on the rake, a rearwardly disposed arm engaged with the intermediate portion of the abutment and carrying a spur on its rear end adapted for engagement with the surface over which the push rake moves whereby to cause said abutment to be moved when in inoperative position on the rake, hingedly connected bracing arms pivoted at their opposite ends to the abutment and portions of the frame, an arm pivotally supported on the frame at a point above the rake having connection with the hingedly connected arms, an operating lever mounted on the rear end of the wheeled frame, and means for connecting said operating lever to the free end of the pivoted arm for imparting movement thereto upon the rocking of the operating lever whereby to break the hinged joint between the bracing arms.

2. In a hay raker, a supporting frame including an axle, carrier wheels and rake teeth mounted on the axle, an abutment device movable over the raker teeth, brace members hingedly united and hingedly coupled respectively relatively to the axle and to the abutment, an operating lever mounted to swing intermediate its ends relative to the frame, pull cables connected to said lever at one end and to said brace member, a cable guide pulley carried by said lever, a stop member extending rearwardly of said abutment and having a terminal spur, a cable device connected respectively to said abutment and to said stop member and leading over said guide pulley, and means for operating said lever to move the abutment into rearward position and hold the same while the raker is being moved rearwardly.

In testimony whereof, I affix my signature hereto.

ALFRED JOHN GIBBS.